Feb. 9, 1971 J. A. DIEMER 3,561,102
PROCESS OF FORMING A COLD DRIVEN RIVETED JOINT
Filed Sept. 25, 1968
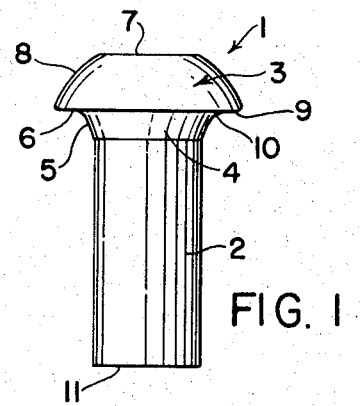
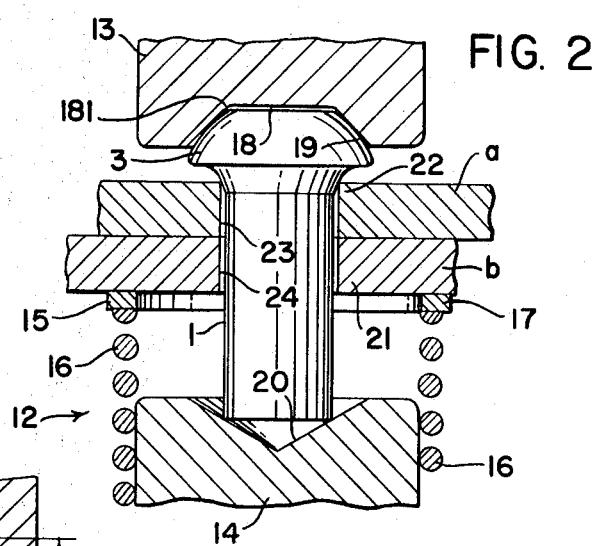
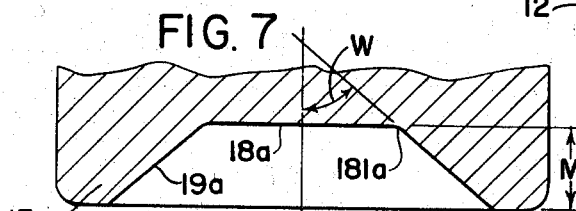
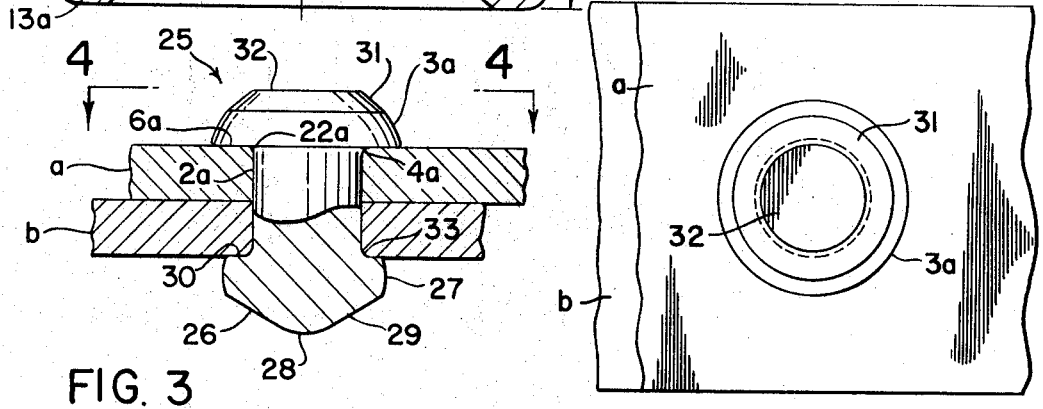
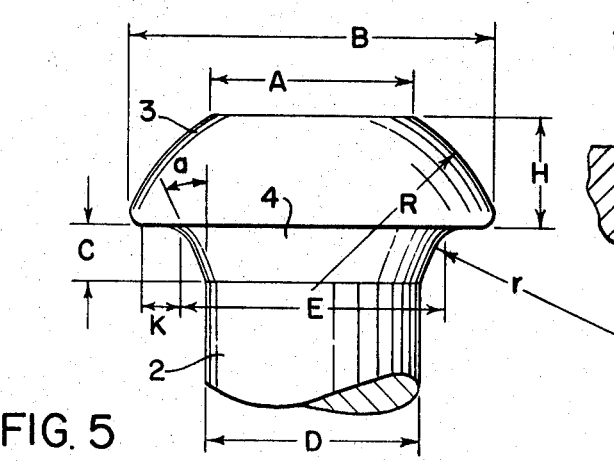
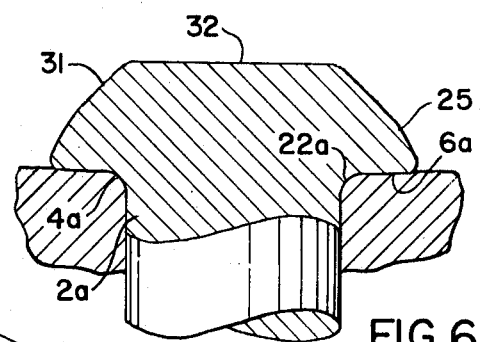
INVENTOR.
JOSEPH A. DIEMER
BY
McCoy, Greene & Howell
ATTORNEYS United States Patent Office 3,561,102
Patented Feb. 9, 1971

3,561,102
PROCESS OF FORMING A COLD DRIVEN
RIVETED JOINT
Joseph A. Diemer, Flossmoor, Ill., assignor to Champion Commercial Industries, Inc., Cuyahoga, Ohio, a corporation of Ohio
Filed Sept. 25, 1968, Ser. No. 762,412
Int. Cl. B21d 39/00; B23p 11/00
U.S. Cl. 29—509                                15 Claims

ABSTRACT OF THE DISCLOSURE

A riveted joint formed by a cold-formed button-head rivet of low-carbon steel having a shank, a tapered neck, and a flattened semispheroidal head with a diameter about 1.6 to 1.8 times the diameter of the shank, the outer surface of said neck which engages the upper edge of the rivet hole being inclined about 20 to 25 degrees relative to the rivet axis. In forming such joint the rivet is driven cold without annealing by subjecting it to a clamping force of 20 to 100 tons to expand the shank about 4 to 10 percent and thereby expand the rivet holes at least 2 percent. The manufactured head of the rivet is deformed by a rivet-driving member having a tapered recess with a flattened bottom surface and a frusto-conical surface generated by rotating about an axis in a line inclined about 40 to 50 degrees relative to said axis.

---

The present invention relates to riveted joints and a process of forming such joints using special cold-formed buttonhead rivets and recessed rivet-driving members.

Heretofore high quality riveted joints have been made by driving steel button-head rivets while they were red hot or by driving cold-headed steel rivets after they have been annealed. Such annealing is necessary to prevent failure of conventional rivets in the vicinity of the manufactured head.

The present invention relates to formation of riveted joints without an annealing step by cold driving of special cold-headed rivets having a flattened generally semispheroidal head and a tapered neck using special recessed rivet-driving means. A proper riveting procedure is essential, and the size and shape of the rivet head and neck are critical. The neck is of such size that it engages the marginal edge portion of the rivet hole in the plate to be riveted and cold works that edge portion to round it and increase its tensile strength while the neck is simultaneously deformed to provide a rounded fillet. This provides the riveted joint with high strength in those arease where common riveted joints tend to fail.

In making a rivet for use in the process of this invention, a rod of low-carbon steel is cold drawn to reduce its diameter at least 2 percent and is then cold headed in a single blow to produce a rivet with a shank having a diameter about 1 to about 4 percent greater than the diameter of the cold-drawn rod, a flattened semispheroidal button head having a diameter at least 1.6 times the shank diameter, and a special tapered neck. Such cold working of the metal greatly increases the tensile strength of the rivet for example to 70,000 pounds per square inch or more. The cold worked rivet is then placed in rivet holes of low-carbon steel plates or other steel members to be joined and driven under an extremely high pressure sufficient to expand the rivet holes at least 2 percent and cold work the metal at the margin of the rivet hole. The cold working of the low-carbon steel plates during the riveting operation increases the tensile strength of the plates to substantially more than 75,000 pounds per square inch near the periphery of the rivet and in the annular fillets produced at opposite ends of the shank.

In forming a riveted joint according to this invention, a rivet-driving member is employed having a tapered recess with a frusto-conical surface generated by rotating about an axis a line inclined about 40 to 50 degrees relative to said axis. In a rivet-driving machine, for example, such recess would have a flattened surface, with a diameter usually less than that of the flattened upper surface of the manufactured rivet head, which may be out of contact with the rivet when said frusto-conical surface initially engages the rounded upper marginal portion of the rivet and moves against the rivet head as the rivet is deformed.

Because the cold-headed rivet of this invention has a hardness and tensile strength much greater than those of annealed rivets and is shaped to expand the rivet hole, one would naturally expect that greater pressure would be required to drive such rivet. Surprisingly this is not the case. In fact, excellent results are obtained using pressures somewhat less than those recommended for driving annealed rivets of the same diameter.

Objects of the invention are to provide a riveted joint of maximum strength and maximum effective life and a more reliable process of making such joints without prior heating or annealing of the rivets.

These and other objects, uses and advantages of the invention will become apparent from the following description and claims and from the drawings, in which:

FIG. 1 is a side view of a rivet made according to this invention;

FIG. 2 is a fragmentary vertical sectional view showing a riveting apparatus with the parts in their positions at the beginning of the riveting operation;

FIG. 3 is a fragmentary elevational view showing the completed riveted joint formed by the apparatus of FIG. 2;

FIG. 4 is a fragmentary top view looking the direction of the arrows 4—4 in FIG. 3;

FIG. 5 is a fragmentary side view of the rivet of FIG. 1 on a larger scale;

FIG. 6 is a fragmentary view of the completed riveted joint; and

FIG. 7 is a fragmentary vertical sectional view of a modified form of rivet-driving hammer.

Referring more particularly to the drawings, in which like parts are identified by the same numerals throughout the several views, FIG. 1 shows a cold-formed steel rivet 1 made according to the present invention having a cylindrical shank 2, a manufactured button head 3 with a flattened substantially semi-spheroidal upper surface, and a tapered neck 4 extending from the shank to the bottom of the head. As shown in the drawings, the neck 4 has a tapered outer surface 5 which substantially conforms to a surface of revolution coaxial with said head and said shank. Said surface of revolution may be conical or may be generated by rotating a plan curve, such as an arc of a circle, about a line in its plane corresponding to the rivet axis.

The head 3 has a flat annular bottom surface 6 extending a substantial distance radially outwardly from the neck 4 in a plane perpendicular to the axis. The external surface of the head conforms substantially to a surface of revolution coaxial with the shank and includes a flattened upper surface 7. The remaining semispheroidal surface 8 forming the upper margin of the head extends downwardly from the surface 7 to the inturned edge portion 9, which has a beveled or rounded surface. The flat bottom surface 6 of the head extends radially inwardly a substantial distance to a fillet 10 at the upper end of the neck 4.

The rivet 1 is formed of a conventional low-carbon steel or the like, with a carbon content no greater than about .25 percent as is commonly used for rivets. Such steel preferably has a carbon content of 0.05 to 0.20 percent. Excellent results can be obtained, for example, using SAE 1010 to SAE 1017 steel. The rivets are made from a cold-drawn rod of such steel in a conventional type of cold heading machine or similar machine.

In order to permit cold driving of a cold-headed rivet according to this invention, it is necessary to provide the head 3 and the neck 4 with the critical shapes and sizes. The head 3 must have a diameter B at least 1.6 times the diameter D of the shank 2. As previously pointed out, the external surface of the neck 4 substantially follows a surface of revolution, such as generated by a straight line or an arc. Such surface of revolution has a diameter E at the plane of the bottom surface 6 which is about 12 to about 25 percent greater than the diameter D of said frusto-conical surface at the shank. The increase in diameter of said surface of revolution from the shank to the plane of the surface 6 is equal to about 0.72 to about 0.94 times the axial length C of said neck measured parallel to the rivet axis. The diameter E, of course, does not include the fillet 10, which extends outwardly of said surface of revolution.

The surface 5 below the fillet 10 may be frusto-conical or may be curved somewhat in cross section, but such curvature must be limited. Where the surface 5 conforms to a surface of revolution generated by rotating an arc of a circle about the rivet axis, the radius of curvature $r$ of said line should be at least 0.8 times the shank diameter D. The surface 5 preferably conforms substantially to a frusto-conical surface generated by rotating about the rivet axis a line in the plane of said axis which is inclined about 20° to about 25° relative to said axis, as shown by the angle $a$ in FIG. 5.

The manufactured head 3 has a diameter B which is 1.6 to 1.8 times the shank diameter D and the generally flat annular bottom surface 6 of the head has a radial width which is preferably at least about one-tenth the diameter D. The flattened upper surface 7 has a diameter A which is about 0.7 to 1.2 times the diameter D. Said flattened surface may be flat or somewhat spherical and should have a radius of curvature greater than the diameter B of the head. Such surface 7 is preferably generally flat—that is, it preferably has a radius of curvature greater than twice the shank diameter D. The minimum distance from the plane of the surface 6 (the bottom of the head) to the surface 7 is about 0.4 times the shank diameter D, and the overall height H of the head is about 0.4 to about 0.6 times said diameter. The radius of curvature R of the semispheroidal upper surface 8 is 0.6 to 1.2 times the shank diameter D and preferably 0.8 to 1.0 times said diameter, the center of curvature usually being located at or near the rivet axis. The total volume of the head 3 and the frusto-conical neck 4, including all of the material above the bottom end of the neck, is about 1 to about 1.6 times the volume of a cylinder having a length and a diameter equal to the shank diameter D.

The flat annular bottom surface 6 of the head 3 has a substantial radial width and an outside diameter equal to E plus 2K, where K is at least 0.13 inch and includes the width of the surface 6 and the neck fillet 10. The radius F of the neck fillet 10 must be at least about one tenth of shank diameter D and may be about one-fifth said shank diameter or somewhat greater in a rivet of the type shown in FIGS. 1 and 5.

The cold-headed steel rivet of this invention is designed for riveting conventional low-carbon steel plates and similar steel members. The steel used in such plates should be a conventional low-carbon steel with a carbon content preferably no greater than 0.25 percent, such as SAE 1020 steel or other steel commonly used for structural steel members. The plates preferably have a tensile strength of about 50,000 to 70,000 pounds per square inch before the riveting operation.

The present invention is particularly concerned with the use of structural rivets with a shank diameter D of about ½ to about 1 inch and larger rivets with shank diameters up to 1½ inches or so. Such rivets are usually used with rivet holes having diameters about 3 to about 13 percent greater than the shank diameter D, but the clearance may be only 1 or 2 percent with the large rivets such as those having a shank diameter greater than 1 inch or even less if spear reaming is employed to provide the proper size hole and the necessary hole alignment. Excellent results are obtained when the diameter of each rivet hole is about 4 to about 10 percent greater than the shank diameter D. With the more common structural rivets having shank diameters of ½ inch to ⅞ inch, rivet holes usually have a diameter about $\frac{1}{32}$ inch to about $\frac{1}{16}$ inch greater than the shank diameter D, and the rivet of this invention is preferably designed for use with holes of this size.

The length of the rivet 1 depends upon the thickness of the steel plates or other structural members to be riveted. As is well understood in the art, the rivet length should take into consideration the grip length and to some extent the hole size. The length of the rivet of this invention measured from the surface 6 to the bottom surface 11 of the rivet is equal to the grip length plus about 1.2D to about 1.5D, where D is the shank diameter. The grip length is the distance between the heads 3a and 26 in the riveted joint shown in FIG. 3.

The rivet used in the present invention is formed from a cold-drawn rod of low-carbon steel. Such rod may, for example, be formed from a hot-rolled steel rod which is cold worked by drawing it through a die to reduce its diameter 3 to 5 percent or so. In performing the process of this invention, such cold-drawn steel rod is cold formed (for example, at room temperature or a temperature between 15° C. and 75° C.) in one step by applying an axial pressure of many tons to form a button-head rivet of the character described above having a shank with a tensile strength preferably greater than 70,000 p.s.i. Such operation would preferably be performed in a conventional type of cold-heading machine and would preferably expand the cold-drawn rod to provide a shank 2 having a diameter D about 1 to about 4 percent greater than the diameter of said rod while simultaneously reducing the axial length of the cut portion of the rod providing the rivet an amount equal to about 0.4D to about 0.8D. The length of such portion of the rod is substantially greater than the overall length of the rivet because the total volume of metal in the head 3 and the neck 4 must be about 1 to about 1.6 times the volume of a cylinder having a diameter and length equal to D.

The dimensions of a typical cold-headed ⅝-inch rivet made according to this invention such as the rivet shown in FIG. 5, may, for example, be as follows:

A=0.582 to 0.586 inch     F=0.12 to 0.13 inch
B=1.031 to 1.094 inch     H=0.312 to 0.343 inch
C=$\frac{5}{32}$ inch     R=0.553 inch
D=0.600 to 0.655 inch     Angle $a$=21 to 23 degrees A typical ¾-inch rivet made according to this invention may, for example, have the following dimensions:

A=0.698 to 0.702 inch     F=0.12 to 0.13 inch
B=1.250 to 1.344 inch     H=0.375 to 0.406 inch
C=0.187 to 0.188 inch     R=0.662 to 0.666 inch
D=0.725 to 0.780 inch     Angle $a$=21 to 23 degrees In driving rivets according to this invention, a rivet squeezer is employed having an upper rivet-driving member 13 and driving hammer 14. The rivet squeezer may be part of a conventional type of riveting machine and preferably has a plate-clamping device 15 with a helical spring 16 biasing an annular plate 17 upwardly against the bottom of the plate $b$.

The plate clamping device 15 is preferred to apply an initial pressure to the material "sandwich" before contact is physically made with the top surface 7 of the rivet. This aids in obtaining proper positioning of the parts during the riveting operation but is not essential.

The rivet driving member 13 serves as a bucking hammer and, in accordance with the invention, has a tapered recess of a particular shape for receiving the head 3 of the rivet. The driving hammer is conventional and has a conical surface 20 which forms the conventional head 26 of the finished riveted joint. The surface 20 may, for example, be generated by rotating about a vertical axis a straight line inclined at an angle of 60 degrees relative to said axis.

The head-receiving recess has a flattened bottom surface 18, a frusto-conical surface 19 and an annular fillet 181. The surface 18 has a diameter about 0.93 to about 1.02 times the diameter A of the flattened surface 7 of the head and is preferably parallel to or uniformly spaced from the surface 7. The tapered frusto-conical surface 19 permits radial outward flow of the metal as the head 3 is deformed and provides the finished rivet head with a tapered surface 31 as shown in FIG. 6. The surface 19 is a surface of revolution generated by revolving a straight line about an axis in its plane which is perpendicular to the flat surface 18, said straight line being inclined at an angle W of 40 to 50 degrees and preferably 40 to 45 degrees relative to said axis. The rounded marginal surface 8 of the head engages the surface 19 throughout its circumference to resist movement of the hammer 13 and preferably holds the bottom surface 18 of the recess out of contact with the surface 7 during the initial stages of the riveting operation. Thus, at the beginning of the riveting operation as shown in FIG. 2, the surface 18 may be parallel to and spaced from the surface 7 a distance equal to about 0.05 to about 0.15 times the shank diameter while the surface 19 rests on the surface 8. After the head 3 is deformed by the high pressure, the surface 18 of the recess may move into contact with the surface 7, but this is not essential. The depth M of the recess is less than the height H of the head and is preferably at least half said height. Such depth is preferably 0.3 to 0.4 times the shank diameter D and is usually at least one-third said diameter as shown in the drawings.

FIG. 7 shows a bucking hammer, similar to the rivet driving member 13 where the angle W is 50 degrees. The surfaces 18a, 19a, and 181a correspond to the surfaces 18, 19 and 181 of the member 13, where the angle W may be 45 degrees. The fillet 181a is provided to increase the life of the tool 13 and preferably has a radium equal to about 0.1 to about 0.3 times the shank diameter D.

As shown, the rivet 1 extends through rivet holes of two or more flat low-carbon steel plates a and b, said rivet holes having internal cylindrical surfaces 23 and 24 which are preferably substantially in alignment. The upper marginal edge portion 22 of the upper rivet hole may have relatively sharp corners and has a diameter equal to that of the surface 23. Said edge portion 22 engages the neck 4 throughout its circumference and preferably at the medial portion thereof in a plane parallel to and spaced from the flat bottom surface 6 of the head a distance which is about one-third to about two-thirds the axial height C of the neck. Thus, the bottom surface 6 is supported a substantial distance from the flat upper surface of the plate a at the beginning of the riveting operation as shown in FIG. 2. When the rivet is positioned as shown in that figure, the effective portion of the tapered outer surface 5 at and radially outwardly of the marginal edge at 22 should have an inclination (angle a) of about 20 to about 25 degrees relative to the rivet axis (see FIG. 5).

In driving the rivet according to the process of this invention, there is applied an extremely high pressure of at least 20 tons and usually around 25 to 150 tons depending on the size of the rivet. With ½ inch rivets, the pressure might be around 25 to 35 tons. With a ¾ inch rivet, the pressure might be around 60 to 70 tons. With a one inch rivet the pressure might be around 110 to 120 tons. With common structural rivets having shank diameters up to ⅞ inch, the pressure is between 20 tons and 100 tons. Such pressure is preferably sufficient to expand the shank 2 at least about 4 percent and to fill and expand the rivet holes but should not be so great as to drive the manufactured head a substantial distance into the plate. Such pressure is usually sufficient to expand the shank 2 about 5 to about 10 percent during the riveting operation and may expand the rivet holes sufficiently to increase the tensile strength of the plate 25 percent or more at the periphery of the expanded rivet shank 2a to more than 80,000 p.s.i. For example, the cold working of the steel plate due to expansion of the rivet hole may provide the plate with a tensile strength adjacent the rivet shank which is 75,000 to 85,000 p.s.i. or more and at least 90 percent of the tensile strength of said shank.

At the start of the riveting operation (see FIG. 2) the pressure is applied to force the neck 4 against the edge portion 22 of the rivet hole and to begin formation of the head 26. As the head 26 is being formed the neck 4 cold works the steel of the edge portion 22 to increase its tensile strength at least 20 and prferably at least 25 percent and deforms the edge portion to provide a rounded corner 22a. Simultaneously the neck 4 is cold worked and deformed to provide an annular fillet 4a which conforms to the shape of said corner 22a.

At the end of the riveting operation, the finished rivet 25 has an appearance substantially as shown in FIGS. 3 and 6. The completed rivet has a button head 26 with a bulged marginal surface 27, a rounded bottom surface 28 and a frusto-conical bottom surface 29 extending between the surfaces 27 and 28. The volume of the head 26 is preferably about 0.8 to about 1.2 times the final volume of the head 3a. The head 26 has a generally flat surface 30 similar to the surface 6 and an annular fillet 33 is produced adjacent the surface 30 due to the deformation of the lower marginal edge portion 21 of the lower rivet hole. The head 3a at the opposite end of the rivet is also deformed during the riveting operation and has a frusto-conical surface 31 extending outwardly from the flat upper surface 32.

When using a rivet driving member 13 having a head-receiving recess made according to this invention and applying the pressure properly, as with equipment of the type shown in FIG. 2, the head 3a fits tightly against the plate a and the fillet 4a has a rounded cross section and fits tightly against the rounded shoulder 22a generally as shown in FIG. 6. In such a case the riveted joint is far superior to anything which has heretofore been produced. The improved strength of the cold-worked steel of the plate at the shoulder 22a and at the margin of the expanded rivet hole eliminates failures which are typical of cold-driven annealed rivets and hot-driven rivets. The tensile strength of the driven rivets of this invention is also much higher for a given cross section. Furthermore, the cross section of the rivet shank is increased during the riveting operation to further increase the overall strength of the joint. Such increase is substantially greater than is obtained when driving hot rivets, which do not expand the rivet holes, or cold driving annealed rivets which do not expand the rivet holes substantially. Furthermore, no conventional rivet generates any fillet as shown in 4a, FIG. 3.

In the preferred process of this invention the steel plates a and b have a tensile strength of 50,000 to 70,000 pounds per square inch which is increased to more than 75,000 and preferably more than 80,000 pounds per square inch by cold working of the steel at the shoulder 22a and at the periphery of the rivet shank 2a. Such cold working may provide the plates with a tensile strength at such locations which is at least 90 percent of the tensile strength of the driven rivet.

The special rivets used in the process of this invention are often used in conjunction with conventional rivets in the manufacture of products, such as railroad cars, where some of the riveted joints are less severely stressed than others. If the latter joints do not fail, the remaining joints are not likely to fail. Thus, in some railroad cars, perhaps less than 25 percent of the riveted joints would be stressed enough to require the rivet of this invention. In the remaining joints it would sometimes be more convenient to employ other types of rivets even though they produce an inferior joint.

The following example is for the purpose of illustrating the invention rather than defining limits. A ¾-inch rivet made according to this invention may, for example, be made from a hot-rolled cylindrical rod of rimmed steel, SAE 1010, which is cold drawn through a suitable die to reduce its diameter about 4 percent from a diameter somewhat greater than ¾ inch to a diameter less than ¾ inch. Such cold-drawn rod is then placed in a die of a cold-heading machine having a cylindrical portion with an internal diameter of about ¾ inch and about 0.015 inch greater than the diameter of the cold-drawn rod and cold worked under a pressure greater than 50 tons to provide a ¾ inch rivet similar to the rivet of FIGS. 1 and 5 with a tensile strength of 70,000 to 75,000 p.s.i. having approximately the following dimensions:

A=.70 inch      F=0.13 inch
B=1.28 inch     H=0.38 inch
C=0.19 inch     R=0.66 inch
D=0.75 inch     Angle a=22 degrees
E=0.90 inch Such cold-worked rivet is thereafter used in an apparatus of the type shown in FIG. 2 having a rivet driving hammer 13 whose head-receiving recess has a depth of 0.25 inch and a flat surface 18 with a diameter of about 0.71 inch. The angle W for the frusto-conical surface 19 is 40 degrees and the corresponding angle for the surface 20 is 60 degrees. The rivet is placed in rivet holes of two low-carbon steel plates having a tensile strength of 50,000 to 70,000 pounds per square inch and subjected to a pressure of 60 tons or so by the hammers 13 and 14 to effect further cold working of the rivet and to expand the rivet hole materially, thereby cold working the metal of the plates adjacent the rivet. For example, the expansion of the shank of the rivet may be sufficient to expand the rivet hole from .812 inch to .837 inch and to increase the tensile strength of the plate to 75,000 to 85,000 p.s.i. or more at the periphery of the rivet shank while simultaneously increasing the tensile strength of the rivet shank to 90,000 to 100,000 p.s.i. or more.

The process of this invention is well suited for modern riveting machines, such as those designed for use with annealed structural rivets in the manufacture of steel railroad cars. Riveted joints made according to this invention are far superior to any joint which can be produced from hot rivets or annealed rivets. The process of this invention makes it possible to produce railroad cars of extremely high quality, for example, when used to produce the most severely stressed joints of the car. The less severely stressed joints may employ weaker rivets, such as hot rivet.

As used herein the expression "radius of curvature" relates to a surface of revolution generated by rotating a plane curve about a straight line at or near the rivet axis which is located in the plane of said curve. Such expression defines the radius of curvature of such curve. The expression "surface of revolution" refers to a conical surface or a surface generated by rotating an arc of a circle about an axis in its plane.

It will be understood that, in accordance with the patent laws, variations and modifications of the specific devices, products and processes disclosed herein may be made without departing from the spirit of the invention.

Having described my invention, I claim:

1. A process comprising deforming a cold-drawn rod of low-carbon steel at a temperature below 100° C. by applying axial pressure thereto to form a rivet having a cylindrical shank with a diameter (D) of about ⅜ inch to about 1½ inches, a neck having a tapered outer surface substantially following a surface of revolution coaxial with said shank, and a flattened semi-spheroidal head having a diameter of at least 1.6 times the diameter (D) of said shank, said surface of revolution increasing in diameter from the shank to the head an amount equal to about 0.72 to about 0.94 times the axial length (C) of said neck and having a diameter (E) at the bottom of the head about 12 to about 25 percent greater than the diameter (D) of said shank, placing such cold-worked rivet in a hole of a structural member without prior annealing and subjecting the rivet to a high clamping force to upset the rivet and to effect further cold working of the metal to form a riveted joint, said force being applied to the manufactured head of the rivet by a rivet driving member having a tapered recess substantially coaxial with the rivet which receives the rivet head and engages the rounded margin of the head, said recess having a frusto-conical surface inclined at an angle of about 40 to 50 degrees relative to its axis.

2. A process as defined in claim 1 wherein the cold-worked rivet placed in the hole of said structural member is subjected to a clamping force of more than 10 tons, said force being sufficient to expand said hole at least 2 percent.

3. A process as defined in claim 2 wherein said hole has a diameter about 1 to about 10 percent greater than the diameter (D) of said shank and the neck of the rivet is forced against the marginal edge portion of the hole to round off and cold work said edge portion while said neck is simultaneously deformed to provide a rounded fillet conforming to the final shape of said edge portion.

4. A process as defined in claim 1 wherein the cold-worked rivet is placed in rivet holes of at least two structural members so that the shank projects through said members a distance no greater than 1.6 times the diameter of said shank, said holes having a diameter about 1 to about 10 percent greater than the diameter of said shank, and the rivet is further worked by subjecting it to an axial force of more than 10 tons to cold work and round off the edge portion of the upper hole, to cause said shank to expand the rivet holes substantially and to form a head on the end of the rivet opposite the manufactured head.

5. A process as defined in claim 4 wherein said shank has a diameter of about ½ inch to about ⅞ inch and the riveted joint is formed by applying a pressure of about 20 to about 100 tons to expand the rivet holes at least 2 percent.

6. A process of making a riveted joint without annealing comprising cold-heating a cold-drawn rod of low-carbon steel to form a rivet with a shank having a diameter D about 1 to about 4 percent greater than the diameter of said rod, a flattened semi-sphericidal button head having a diameter of at least 1.6D and having an annular bottom surface extending radially outwardly in a direction substantially perpendicular to the rivet axis, and a neck extending between said head and said shank having a tapered outer surface, said rod being deformed to reduce its axial length about 0.4D to about 0.8D, inserting the shank of said cold formed rivet through the substantially cylindrical rivet holes of a plurality of steel plates so that the marginal edge portion of one cylindrical rivet hole engages the said neck substantially at the medial portion thereof and generally throughout the circumference of said neck, the portion of the tapered outer surface of said neck near and radially outwardly of said marginal edge having an inclination (a) of about 20 to about 25 degrees relative to the rivet axis, cold driving the rivet at a pressure of at least 20 tons to cold work said marginal edge portion of the rivet hole and provide it with a rounded cross section while expanding the rivet holes and forcing the manufactured head against one of said plates to increase the radial width of said flat annular bottom surface, and simultaneously upsetting the terminal end of the shank to form a button head, the force being applied to said button head by a rivet driving member having a tapered recess which receives said head and engages the rounded margin of the head, said recess having a frusto-conical surface with its axis substantially at the rivet axis and inclined at an angle of about 40 to 50 degrees relative to its axis.

7. A process as defined in claim 6 wherein said last-named button head has a volume about 0.8 to about 1.2 times the final volume of the other head.

8. A process as defined in claim 6 wherein the length of said rivet prior to driving measured from said flat bottom surface to the end of said shank is about 1.2D to about 1.5D greater than the grip distance between the two heads of the driven rivet and the pressure applied to the rivet during driving is about 25 to about 120 tons and sufficient to expand the shank about 4 to about 10 percent and to expand the rivet holes.

9. A process as defined in claim 6 wherein a rod of hot rolled steel is drawn through a die to reduce its diameter about 3 to about 5 percent and to form said cold-drawn rod and wherein said cold-drawn rod is cold headed to form said head and said neck in a single blow while increasing the tensile strength of the steel in said shank to at least 70,000 pounds per square inch.

10. A process as defined in claim 9 wherein the cold-headed rivet is driven under a pressure of about 20 to about 120 tons sufficient to expand the rivet holes and to increase the tensile strength of the steel plates adjacent the rivet at least about 25 percent to at least 80,000 pounds per square inch.

11. A process as defined in claim 9 wherein the marginal edge portion of the steel plate adjacent the tapered neck of the rivet has a tensile strength of about 50,000 to about 70,000 pounds per square inch at the beginning of the riveting operation and is cold worked during riveting to provide a fillet with a tensile strength adjacent the rivet which is at least 75,000 pounds per square inch and at least 90 percent of the tensile strength of the driven rivet.

12. In a process comprising deforming a cold-drawn rod of low-carbon steel by applying axial pressure thereto to form a rivet having a cylindrical shank (2) with a diameter (D) of about ½ to about 1½ inches, a flattened generally semi-spheroidal head (3) having a diameter about 1.6 to about 1.8 times the diameter (D) of said shank and an average height (H) about 0.4 to about 0.6 times said diameter (D), and a neck (4) having a tapered outer surface (5) substantially following a surface of revolution coaxial with said shank, said surface of revolution increasing in diameter from the shank to the head an amount equal to about 0.72 to about 0.94 times the axial length (C) of said neck and having a diameter (E) at the bottom of the head about 12 to about 25 percent greater than the diameter (D) of said shank, and placing the cold-worked rivet in a hole of a structural member without prior annealing and subjecting it to a clamping force of more than 10 tons to effect further cold-working of the metal, to expand said shank, and to form a riveted joint, the improvement which comprises applying said clamping force by a rivet-driving member (13) having a tapered recess with a depth less than the height (H) of said head which receives said head, said recess having a flattened bottom surface (18) with a diameter about 0.93 to about 1.02 times the diameter (A) of the flattened upper surface (7) of said head and having a frusto-conical surface (19) generated by a line inclined about 40 to 50 degrees relative to the axis, the rounded margin of said head engaging said frusto-conical surface throughout its circumference to resist movement of said rivet-driving member and to hold said bottom surface (18) out of contact with the head during the initial stages of the riveting operation, said clamping force expanding said shank sufficiently to expand the rivet hole at least 2 percent.

13. A process as defined in claim 12 wherein said flattened surface (18) is spaced from and generally parallel to the flattened upper surface (7) of said head and is held out of engagement with said head until after said neck (4) is forced into said hole, the rounded upper surface (8) of said head radially outwardly of the flattened upper surface (7) having a radius of curvature (R) equal to 0.6 to 1.2 times the shank diameter (D).

14. A process as defined in claim 13 wherein said bottom surface (18) is spaced from the flattened upper surface (7) of said head a distance equal to about 0.05 to about 0.15 times the shank diameter (D) when said frusto-conical surface (19) initially engages the circumference of the head and wherein said recess has a height (M) equal to about 0.3 to 0.4 times the shank diameter (D).

15. A process as defined in claim 12 wherein said frusto-conical surface (19) is generated by rotating about said axis a line inclined about 40 to about 45 degrees relative to said axis.

References Cited

UNITED STATES PATENTS

| 624,927 | 5/1899 | Gunnell. | |
| 1,554,336 | 9/1925 | De Lapatterie. | |
| 1,723,769 | 8/1925 | Davis | 10—27X |
| 1,966,401 | 7/1934 | Andren | 85—37 |
| 3,405,594 | 10/1968 | Falcioni | 85—37 |

FOREIGN PATENTS

| 318,736 | 9/1929 | Great Britain. |

CHARLIE T. MOON, Primary Examiner

U.S. Cl. X.R.

10—27; 29—522; 85—37; 287—189.36